Dec. 22, 1970 W. A. SAUTER 3,550,041

RF SIGNAL CONTROLLER

Filed Aug. 22, 1969

INVENTOR.
WALTER A. SAUTER

BY John E. Wagner

United States Patent Office 3,550,041

Patented Dec. 22, 1970

3,550,041

RF SIGNAL CONTROLLER

Walter A. Sauter, Malibu, Calif., assignor to American Nucleonics Corporation, Glendale, Calif., a corporation of California Filed Aug. 22, 1969, Ser. No. 852,209
Int. Cl. H01p *1/10, 1/22, 5/12*
U.S. Cl. 333—7 6 Claims

ABSTRACT OF THE DISCLOSURE

This invention relates to a voltage or current controlled device which can regulate the amplitude of a RF signal with fine resolution over a large dynamic range, the control being provided by a DC signal.

It employs a diode network including a pair of series connected PIN diodes with DC bias and control inputs.

In one embodiment a pair of independent DC control input terminals and two pair of diodes are used and conjugate phase RF output is obtained from a single RF input. This invention may be used in the Interference Cancellation System of my application Ser. No. 799,781 filed Feb. 17, 1969.

BACKGROUND OF THE INVENTION

Prior to my invention the control of amplitude of RF signals in the 100 mHz. or higher frequency range has been accomplished primarily using ferrite attenuators, variable coupling loops or mechanical tuning devices. Each of the foregoing have relatively nonlinear attenuation characteristics. None are strictly resistive in characteristic so they tend to introduce unwanted phase shifts as well as attenuation into the signal. Moreover none of these forms of attenuators or signal level controllers are capable of providing controlled linear attenuation of both polarities without some inverting switching device.

Solid state attenuation devices such as field effect transistors are ineffective in the 100 mHz. or higher frequency range. The PIN diode has been recognized as a possible microwave attenuator due to its ability to pass microwave energy with loss or attenuation which may be controlled by a forward DC bias. Both shunt and series attenuators have been proposed prior to my invention.

BRIEF STATEMENT OF THE INVENTION

I have found that a series connected array of PIN diodes each biased and controlled can linearly vary an input RF signal from full signal level to zero to full signal of opposite polarity.

I have also found that it is possible to produce a circuit employing a pair of such diode networks with independent control input terminals to produce a pair of signals of fixed phase relationship and independently controlled amplitude from a common RF input signal.

DETAILED DESCRIPTION OF THE DRAWINGS

These features of this invention may be more clearly understood from the following detailed description and by reference to the drawing in which.

DETAILED DESCRIPTION OF THE INVENTION

Figure 1:
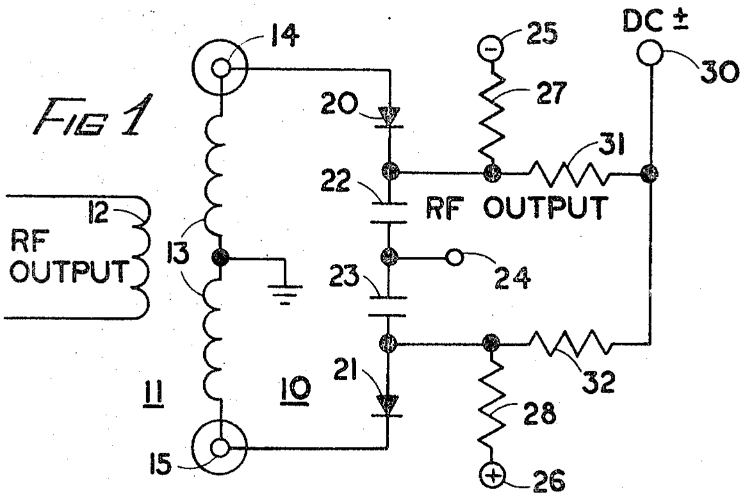
FIG. 1 is an electrical schematic diagram of this invention.

Now referring to FIG. 1, there may be seen a dual attenuator circuit 10 employing a transformer 11 including a primary winding 12 and a center tapped secondary winding 13. The center tap of the secondary winding 13 is referenced to ground. The ends of the secondary winding each provide reference terminals identified for convenience as terminal 14 (180°) and terminal 15 (0°). Two PIN diodes 20 and 21 are connected in series across the secondary winding with intermediate DC blocking capacitors 22 and 23. The diodes 20 and 21 are poled in the same direction. The RF output from the device is taken from the common terminal of the capacitors 22 and 23 at output terminal 24.

Static D bias is provided to each diode 20 and 21 by sources 25 and 26 via respective resistors 27 and 28. A common source 30 of control voltage for the diodes is connected via respective resistors 31 and 32 to the diodes 20 and 21. The static (−) and controllable (±) bias from sources 25 and 30 are applied to the cathode of diode 20 while the static (+) bias and controllable (±) bias from source 30 are applied to the anode of diode 21. The static bias sources 25 and 26 normally bias each of respective diodes 20 and 21 so that the series resistance of each is equal. Under that condition, the phase component of the output signal is zero. As the common control current from source 30 is varied so that one diode 20 or 21 passes more RF current to the output terminal 24, the output signal will increase in the direction of the polarity of the PIN diode which is passing the greater current. The level of output signal is proportional to the difference between the two currents obtained from the two PIN diodes 20 and 21 multiplied by the impedance of the load.

The capacitors 22 and 23 as well as the dropping resistors 27, 28, 31 and 32 are provided to insure proper levels of bias and control currents through PIN diodes 20 and 21 and not through the excitation transformer 11 or at the terminal 24.

In operation, the circuit employing the transformer 11 develops a pair of oppositely phased equal amplitude signals from the incoming RF signal and each is passed through its respective diode 20 and 21. With both diodes biased to equal conduction the two signals of opposite phase cancel each other and no output appears at terminal 24. As the bias on the diodes 20 and 21 is varied simultaneously in opposite directions by the control bias source 30, conduction to the terminal 24 varies. The output signal at terminal 24 constitutes a faithful reproduction of the input RF signal varying only in amplitude and polarity. It is recognized that the phase reversing device 11 is represented simply as a transformer. However, in microwave frequencies with which this invention is directed, it is more likely to constitute a hybrid or other microwave equivalents of a transformer.

Figure 3:
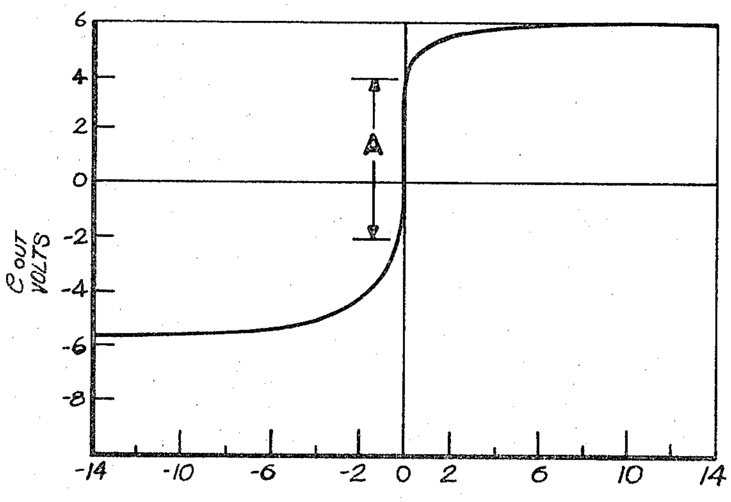
FIG. 3 is a graphical representation of the operating characteristics of the circuit of FIG. 2.

The circuit of FIG. 1 illustrates the basic configuration of this invention designed to attenuate an RF signal with minimum or negligible phase shift. It is unique in that it provides smooth control of the RF level within a broad range of levels with smooth polarity reversal. No switching device is required for polarity reversal. The response of the circuit of FIG. 1 is illustrated in FIG. 3 which shows a smooth S shaped characteristic curve with a linear region centered about a DC control current of 0 and range from approximately −2 to +2.5 volts output at a slope of approximately 12.5/1. This linear portion A is the normal operating region of the signal controller.

Figure 2:
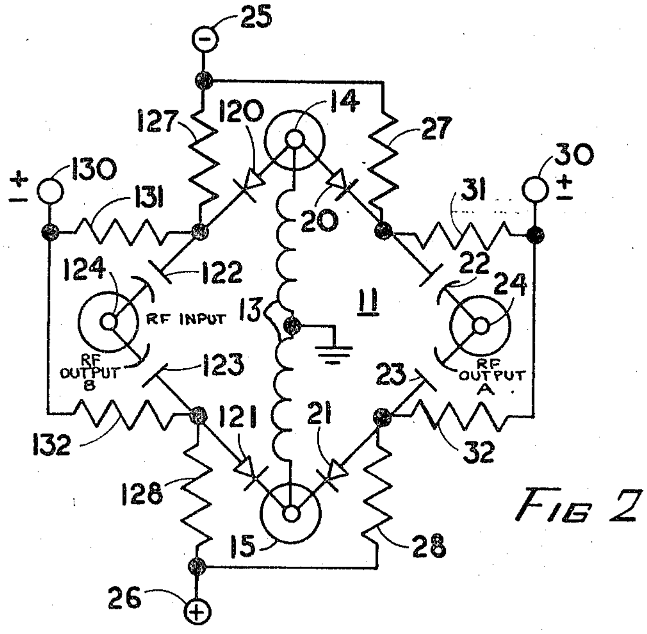
FIG. 2 is an electrical schematic of another embodiment of this invention.

Another feature of the circuit of this invention is illustrated in FIG. 2. The circuit of FIG. 2 allows the derivation of two independently attenuated RF signals from a single RF signal input. This version of the invention is particularly suited for use in the interference cancellation system of my copending application identified above. The circuit of FIG. 2 is primarily a replicated form of the basic circuit and the common components of FIGS. 1 and 2 are given an identical reference numeral for clarity. It employs a similar RF transformer 11 having a grounded center tapped secondary winding 13 and a primary winding (unshown in the drawing). The circuit includes terminals 14 and 15 at the ends of the secondary winding. Connected between the terminals 14 and 15 are a pair of PIN diode networks each of which are similar to those of FIG. 1. One network includes diode 20, capacitor 22, terminals 24, capacitor 23, and diode 21. The second network includes a diode 120, a capacitor 122, an output terminal 124, a capacitor 123, and a diode 121. The two networks have common static bias sources 25 and 26 similar to FIG. 1. The bias for the diodes 20 and 21 is supplied from sources 25 and 26 through resistors 27 and 28 respectively, while similar bias for diodes 120 and 121 is furnished by the same sources 25 and 26 through respective resistors 127 and 128. Similar to FIG. 1, a variable bias for the diodes 20 and 21 is supplied by source 30 through dropping resistors 31 and 32. A second variable bias source 130 supplies control bias to diodes 120 and 121 through respective resistors 131 and 132.

As is apparent from a comparison with FIG. 1, the RF signal applied to the transformer of input device 11 is attenuated in accordance with the control signal applied to terminal 30 and appears at output terminal 24. Similarly the same RF signal at transformer 11 is attenuated in the branch including diodes 120 and 121 under the control signal at terminal 130 to produce an output signal at terminal 124. The two output signals are in phase with each other and with the input RF signal but differ in amplitude and/or polarity depending upon their respective DC control signals.

The embodiments of FIGS. 1 and 2 both exhibit the same operating curve as illustrated in FIG. 3 with the circuit of FIG. 2 providing two channels, each having an independently controlled output. For example, a +2 volt DC control signal applied to terminal 30 will provide a 5 v. RMS RF output at terminal 24. At the same time a −2 volt DC signal applied to control terminal 130 will produce a polarity reversed RF signal having a level of approximately −4 v. RMS. Variation of either control signal does not affect the level of the signal in the opposite network.

The characteristic curve of FIG. 3 is obtained employing the circuit of FIGS. 1 and 2 using the following components:

Diodes 20 and 21—1842–22 Unitrode
Capacitors 22 and 23—510 pf.
Resistors 27 and 28—68 KΩ
Resistors 31 and 32—2 KΩ
Supply:
  25—−15 v. DC
  26—+15 v. DC
  30—±14 v. DC
Winding 13—.15 mh.

Figure 4:
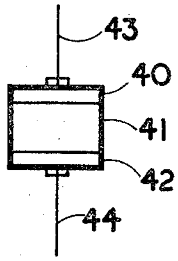
FIG. 4 is an enlarged simplified representation of a PIN diode used in this invention.

In the embodiments of FIGS. 1 and 2 the heart of the signal controllers are the PIN diodes. Their inherent characteristics in the circuit configurations of this invention yield a vastly superior polarity reversing RF signal controller. The PIN diode, as its name indicates and as represented in FIG. 4, is a diode having a P region 40 and an N region 42 separated by a controllable resistance Intrinsic region 41. The diodes act as a variable resistance in either direction when controlled by the DC bias current applied to the diode. Its resistance when in full on condition is in the order of 0.1 ohm. When reverse biased they can block signals as high as 1200 v. The diodes exhibit lifetimes in the order of a microsecond wherein a large RF signal can be passed with minimum distortion or rectification. The terminal pins 43 and 44 are metallurgically bonded to the respective P and N regions. The diode normally is enclosed in a glass housing which may be fused to the diode assembly. Of course other structural arrangements of PIN diode may be equally satisfactory, however, the above type as typified by the UM. series of microwave diode of the Unitrode Corporation of Watertown, Mass. have been found to be most effective.

The above described embodiments of this invention are merely descriptive of its principles and are not to be considered limiting. The scope of this invention instead shall be determined from the scope of the following claims including their equivalents.

I claim:

1. A microwave signal controller comprising input means for producing a pair of opposite polarity components of an input microwave signal:
a common output terminal,
a pair of three layer controllable resistance conducting means, each connected to pass RF signals of opposite polarity to the common output terminal,
static bias means for maintaining each of the three layer controllable resistance conducting means in a preselected conduction condition to provide a linear gain characteristic through zero-gain point,
variable bias means connected to said three layer controllable resistance conducting means to vary the conduction of said last means in opposite sense to control the amplitude and polarity of the RF signal at the output,
said three layer controllable resistance conducting means having sufficient resistance in the blocking direction to prevent the passage of RF signals to the output terminal and when biased in a conduction direction, a resistance which varies inversely with the level of bias current,
wherein said static bias means is connected to apply a predetermined negative bias to the cathode of one three layer controllable resistance conducting means and a predetermined positive bias to the anode of the second three layer conducting means to provide a linear gain characteristic through zero-gain point.

2. The combination in accordance with claim 1 wherein said variable bias means constitutes a source of current of positive, negative, or zero current applied simultaneously to both three layer controllable resistance conducting means whereby said three layer controllable resistance conducting means are simultaneously varied inversely in conduction.

3. The combination in accordance with claim 1 including DC blocking means between the biased controlled electrodes of said first and second three layer controllable resistance conducting means.

4. A circuit for producing two independently amplitude controlled RF signals from a single RF signal source comprising:
phase inverting means for producing a pair of oppositely phased components of an input RF signal,
a first network connected across the phase inverting means,
said first network including a first three layer controllable resistance conducting means connected to conduct RF energy of one polarity to an output terminal,
said first network including a second three layer controllable resistance conducting means connected to pass RF energy of the second polarity to the first output terminal,
a second network connected across the phase inverting means,
said second network including a third three layer controllable resistance conducting means connected to conduct RF energy of one polarity to a second output terminal,
said second network including a fourth three layer controllable resistance conducting means connected to conduct RF energy of the second polarity to said second output terminal, common means for said first and second networks for supplying static bias to each of the three layer controllable conducting means to bias, said three layer controllable resistance conducting means into preselected conducting conditions to provide a linear gain characteristic through zero-gain point, and variable bias means connected to said three layer controllable resistance conducting means to vary the conduction of the three layer controllable resistance conducting means of each network to control the amplitude and polarity of the RF signal at the first and second output terminals.

5. The combination in accordance with claim 4 wherein said three layer controllable resistance conducting means comprises a PIN diode.

6. The combination in accordance with claim 4 wherein the variable bias means comprises two independent bias sources whereby the amplitude and polarity of the output of each of said first and second output terminals may be independently controlled to produce two output signals phase and frequency related to the input RF signal but different in amplitude from the input signal and from each other.

References Cited

UNITED STATES PATENTS

| | | | |
|---|---|---|---|
| 2,808,474 | 10/1957 | Maynard et al. | 330—145 |
| 3,093,802 | 6/1963 | Chow | 333—81X |
| 3,135,934 | 6/1964 | Schoenike | 333—81 |
| 3,297,882 | 1/1967 | Broadhead, Jr. | 333—81 |
| 3,337,749 | 8/1967 | Lee et al. | 333—81 |

OTHER REFERENCES

Microwave Switching Diodes—Catalog SF-50001, March 1963—Microwave Associates, Inc. (Inglewood, Calif.), 4 pages.

ELI LIEBERMAN, Primary Examiner

M. NUSSBAUM, Assistant Examiner

U.S. Cl. X.R.

307—237; 333—81